(12) United States Patent
Shintaku (10) Patent No.: US 11,443,908 B2
(45) Date of Patent: Sep. 13, 2022

(54) SWITCH DEVICE

(71) Applicant: TOYOTA JIDOSHA KABUSHIKI KAISHA, Toyota (JP)

(72) Inventor: Yuji Shintaku, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 262 days.

(21) Appl. No.: 16/846,984

(22) Filed: Apr. 13, 2020

(65) Prior Publication Data

US 2020/0343061 A1 Oct. 29, 2020

(30) Foreign Application Priority Data

Apr. 23, 2019 (JP) .............................. JP2019-081824

(51) Int. Cl.
*H01H 25/04* (2006.01)
*B60K 37/06* (2006.01)
*B62D 1/04* (2006.01)

(52) U.S. Cl.
CPC ............. *H01H 25/04* (2013.01); *B60K 37/06* (2013.01); *B62D 1/046* (2013.01); *H01H 2231/026* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 25/04; H01H 2231/026; B60K 37/06; B62D 1/046; G01B 7/22; G01D 5/2412; G01D 5/2417; G05G 9/047; G05G 9/02; G05G 9/04; G05G 9/06; G05G 9/00; G06F 3/0338; G06F 2203/015; G06F 3/0383
See application file for complete search history.

(56) References Cited

U.S. PATENT DOCUMENTS

| | | | |
|---|---|---|---|
| 6,637,276 B2 * | 10/2003 | Adderton | G01L 5/1627 73/862.41 |
| 7,372,281 B2 * | 5/2008 | Morimoto | H03K 17/975 324/661 |
| 10,061,399 B2 * | 8/2018 | Bushnell | G06F 1/163 |

(Continued)

FOREIGN PATENT DOCUMENTS

| CN | 1624635 A | 6/2005 |
|---|---|---|
| CN | 105765668 A | 7/2016 |

(Continued)

*Primary Examiner* — Ahmed M Saeed
(74) *Attorney, Agent, or Firm* — Dickinson Wright, PLLC (57) ABSTRACT

A switch device includes a base, a mounting member protruding from the base, a plurality of elastic strain sensors, and an input detector. Each of the plurality of elastic strain sensors spans between a top portion of the mounting member and a corresponding one of a plurality of peripheral portions of the base. The plurality of peripheral portions are circumferentially spaced apart from each other around the mounting member. Each of the plurality of elastic strain sensors is configured to change a capacitance according to elongation. The input detector is configured to obtain a change in the capacitance of each of the plurality of elastic strain sensors.

7 Claims, 8 Drawing Sheets

(56) References Cited

U.S. PATENT DOCUMENTS

2005/0123333 A1* 6/2005 Sugimura ............ H01H 25/041
　　　　　　　　　　　　　　　　　　　　　　　400/485
2016/0377409 A1　12/2016 Norisada et al.

FOREIGN PATENT DOCUMENTS

| JP | 2001-074404 A | 3/2001 |
| JP | 2001291456 A | 10/2001 |
| JP | 2005-190460 A | 7/2005 |
| JP | 2009534720 A | 9/2009 |
| WO | 2007081883 A2 | 7/2007 |

* cited by examiner

SWITCH DEVICE

CROSS REFERENCE TO RELATED APPLICATIONS

The present application claims priority from Japanese Patent Application No. 2019-081824 filed on Apr. 23, 2019, which is incorporated by reference herein in its entirety.

BACKGROUND

The present disclosure relates to a switch device.

A switch device disclosed in JP 2001-291456 includes a case, an operation shaft one end of which is held in the case and the other end of which protrudes out from the case, a knob attached to the other end of the operation shaft, a first switch, a second switch, and a third switch. The first switch is switched by a pushing operation of the operation shaft. The second switch is switched by a turning operation of the operation shaft. The third switch is switched by a swinging operation of the operation shaft. The switch device is also provided with a switching means for alternately holding the knob between a first position, at which the knob is separated away from the case, and a second position, at which the knob is brought close to the case, each time the pushing operation of the operation shaft is performed.

SUMMARY

The just-described proposal is an example of the switch device. The present disclosure proposes a switch device with a novel structure that is even simpler than the structure of the switch device disclosed in JP 2001-291456 A.

An embodiment of the switch device proposed herein includes a base, a mounting member protruding from the base, a plurality of elastic strain sensors, and an input detector configured to obtain a change in the capacitance of each of the plurality of elastic strain sensors. Each of the plurality of elastic strain sensors is configured to show an elongation and have a capacitance that changes according the elongation. Each of the plurality of elastic strain sensors spans between an a top portion of the mounting member and a corresponding one of a plurality of peripheral portions of the base, the plurality of peripheral portions being located around the mounting member and circumferentially spaced apart from each other.

The just-described switch device has a structure that is even simpler than the structure of the switch device disclosed in JP 2001-291456 A. In an embodiment of the switch device disclosed herein, the capacitance of each of the plurality of elastic strain sensors changes according to movement of the top portion of the mounting member. Accordingly, it is possible to obtain an output that originates from the change of the capacitance of the plurality of elastic strain sensors.

The plurality of elastic strain sensors may include a first elastic strain sensor, a second elastic strain sensor, a third elastic strain sensor, and a fourth elastic strain sensor.

The first elastic strain sensor may span along a first straight line and between a top portion of the mounting member and a first peripheral portion of the base that is located outward relative to a portion of the base from which the mounting member protrudes. The first straight line passes through the top portion of the mounting member and extends on the base. The second elastic strain sensor may span along the first straight line and between the top portion of the mounting member and a second peripheral portion of the base that is located opposite the first peripheral portion. The third elastic strain sensor spans along a second straight line and between the top portion of the mounting member and a third peripheral portion of the base that is located outward relative to a portion of the base from which the mounting member protrudes. The second straight line passes through the top portion of the mounting member, extends on the base, and is orthogonal to the first straight line. The fourth elastic strain sensor spans along the second straight line and between the top portion of the mounting member and a fourth peripheral portion of the base that is located opposite the third peripheral portion.

The mounting member may include a solid or hollow elastomer. The elastic strain sensors may be arranged along an outer surface of the mounting member. Such an embodiment provides a switch device with soft-touch feel.

The mounting member may include a pedestal and a head member mounted swingably on the pedestal. One end of each of the elastic strain sensors may be attached to the head member. In such an embodiment, a pressure switch may be provided between the pedestal and the head member. The switch device may also include a cover attached to the base so as to cover the head member, and the cover may have at least one opening for operation, disposed at a position corresponding to an intermediate portion of one of the plurality of elastic strain sensors.

BRIEF DESCRIPTION OF THE DRAWINGS

FIG. 4 is a perspective view illustrating a cross section of the elastic strain sensor 13a.

DETAILED DESCRIPTION

The following describes embodiments of a switch device disclosed herein. It should be noted, however, that the embodiments described herein are, of course, not intended to limit the present invention. The features and components that exhibit the same effects are denoted by the same reference symbols as appropriate, and the description thereof will not be repeated. The present invention is not limited to the embodiments described herein unless specifically stated otherwise. Arrows designated as U, D, L R, F, and Rr in the drawings represent respective directions, up, down, left, right, front, and rear. These directional terms, up, down, left, right, front, and rear, are, however, merely provided for purposes in illustration and are not intended to limit the orientations and arrangements of the switch device in any way.

Figure 1:
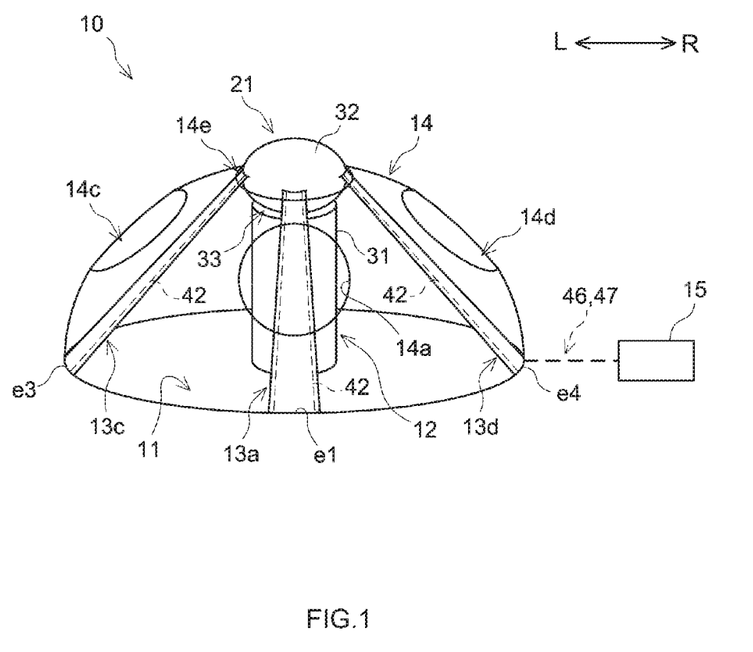
FIG. 1 is a perspective view schematically illustrating a switch device 10 disclosed herein.
Figure 2:
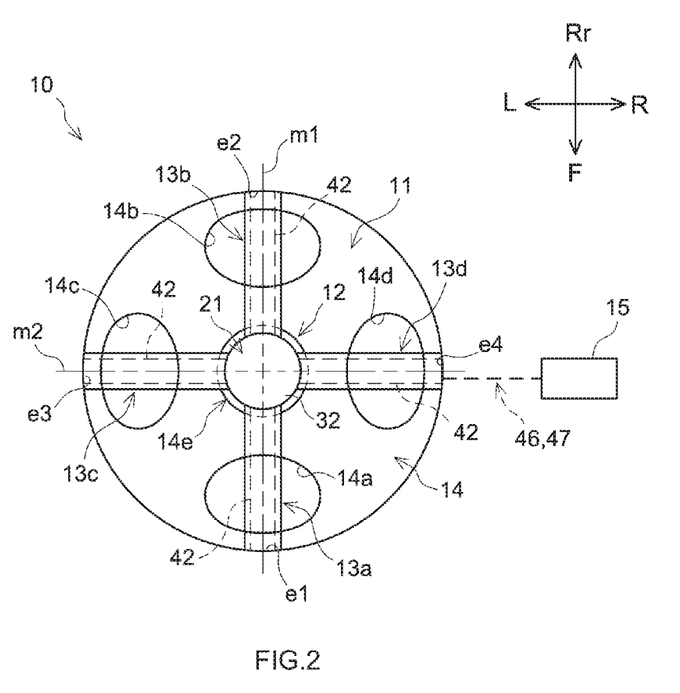
FIG. 2 is a plan view of the switch device 10.

FIG. 1 is a perspective view schematically illustrating a switch device 10 disclosed herein. FIG. 2 is a plan view of the switch device 10.

Switch Device 10

As illustrated in FIG. 1, the switch device 10 includes a base 11, a mounting member 12, a plurality of elastic strain sensors 13a to 13d, a cover 14, and an input detector 15.

Base 11

The base 11 is a member on which the switch device 10 is arranged. The switch device 10 may be disposed, for example, on a center console or a dashboard of a vehicle. When the switch device 10 is one that is disposed on a steering wheel of a vehicle, for example, the base 11 may be a member that is mounted on a spoke portion of the steering wheel. Alternatively, the spoke portion of the steering wheel may be used as the base 11. Note that the switch device 10 is not limited to being used in such applications, unless specifically stated otherwise.

Mounting Member 12

The mounting member 12 protrudes from the base 11. In this embodiment, the mounting member 12 is a separate member from the base 11. The structure of the mounting member 12 is not limited to this example. For example, the mounting member 12 may be formed of a portion of the base 11, for example, a portion of the base 11 itself that rises upwardly.

In this embodiment, the mounting member 12 includes a pedestal 31 and a head member 32 that is mounted swingably on the pedestal 31. For example, the head member 32 may be mounted on the pedestal 31 via a spring element so that it can swing in any direction, frontward, rearward, leftward, or rightward. It is also possible that the pedestal 31 may be provided with a spherical-shaped receiving portion that is disposed at the top of the pedestal 31, and the head member 32 may be provided with a spherical-shaped recess that is placed over the spherical-shaped receiving portion. When this is the case, the head member 32 may be placed over the pedestal 31 so that it can swing in any direction, frontward, rearward, leftward, or rightward. In this embodiment, a pressure switch 33 is provided between the pedestal 31 and the head member 32. When the head member 32 is pressed down relative to the pedestal 31, the pressure switch 33 is pressed accordingly.

Elastic Strain Sensors 13a to 13d

Figure 3:
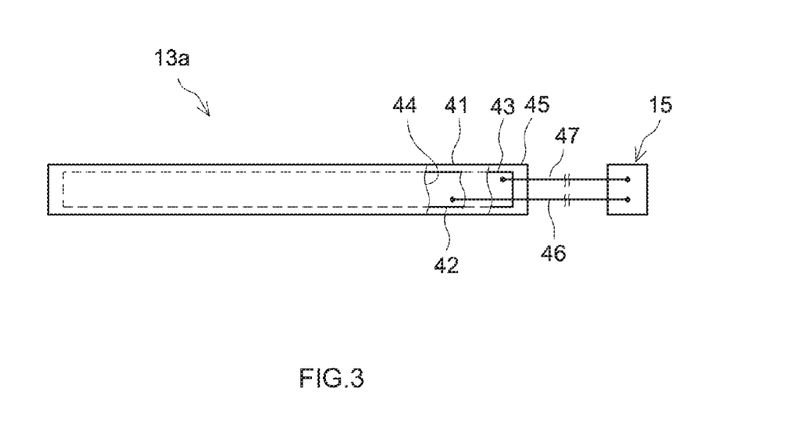
FIG. 3 is a plan view illustrating an elastic strain sensor 13a, which shows a partial cross-sectional view thereof.
Figure 4:
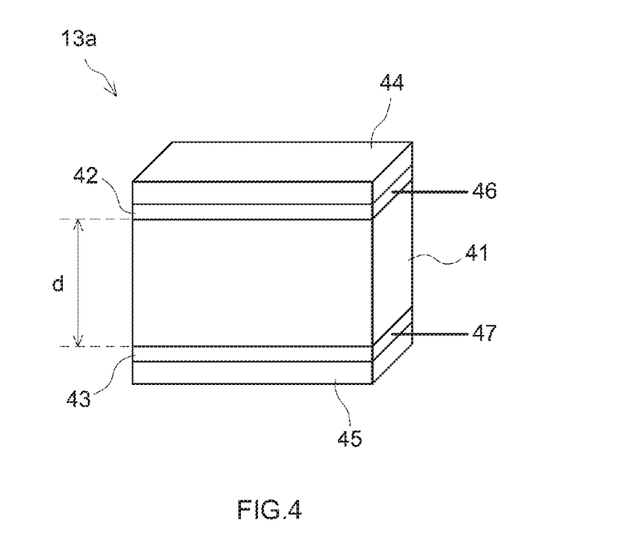
Figure 5:
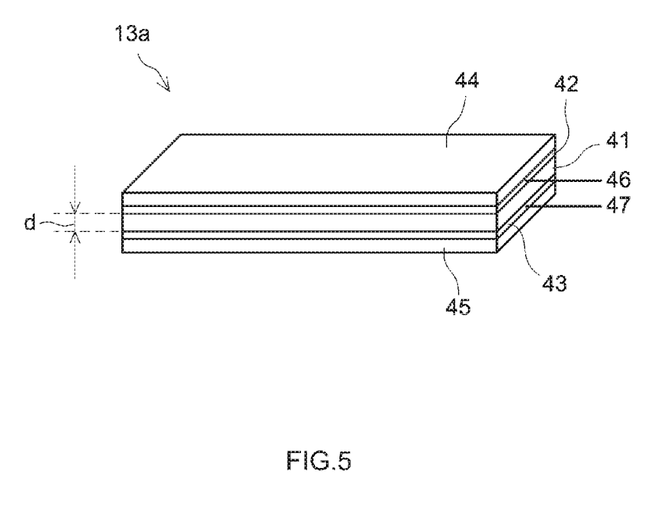
FIG. 5 is a perspective view illustrating a cross section of the elastic strain sensor 13a that has been stretched.

Each of the elastic strain sensors 13a to 13d is a sensor configured to change its capacitance according to its elongation. An example of such a sensor that is usable is an elastic strain sensor C-STRETCH (registered trademark) available from Bando Chemical Industries, Ltd. FIG. 3 is a plan view illustrating an elastic strain sensor 13a, which shows a partial cross-sectional view thereof. FIG. 4 is a perspective view illustrating a cross section of the elastic strain sensor 13a. FIG. 5 is a perspective view illustrating a cross section of the elastic strain sensor 13a that has been stretched.

In this embodiment, as illustrated in FIGS. 3 and 4, each of the elastic strain sensors 13a to 13d includes a dielectric 41, electrodes 42 and 43, protective films 44 and 45, and terminals 46 and 47, for example. The dielectric 41 is a long sheet-shaped elastomer. Each of the electrodes 42 and 43 uses, as the base material, an elastomer that has elasticity similar to the dielectric 41, and an electrically conductive agent is dispersed therein so that electricity can be passed therethrough. Each of the electrodes 42 and 43 is formed in a long electrode extending along a lengthwise direction. Each of the electrodes 42 and 43 is a long sheet-shaped electrode. The electrodes 42 and 43 are opposed to each other across the dielectric 41. The protective films 44 and 45 are laminated on respective outsides of the pair of electrodes 42 and 43. The protective films 44 and 45 respectively cover the electrodes 42 and 43, disposed between the dielectric 41 and the respective protective films 44 and 45, to protect the electrodes 42 and 43. Each of the protective films 44 and 45 may have required weatherproof performance and substantially the same degree of elasticity as the dielectric 41. The terminals 46 and 47 are provided at one end of the elastic strain sensor 13a. The terminal 46 is connected to the electrode 42. The terminal 47 is connected to the electrode 43.

Although only the elastic strain sensor 13a is illustrated herein, all the elastic strain sensors 13a to 13d have the same structure. The capacitance C of each of the elastic strain sensors 13a to 13d is represented as: $C=\varepsilon \cdot (L \cdot W)/d$. Here, $\varepsilon$ is the dielectric constant. L is the length of the electrodes 42 and 43. W is the width of the electrodes 42 and 43. Accordingly, $(L \cdot W)$ is the electrode area S. The parameter d is the interelectrode distance. As seen from FIG. 5, when each of the elastic strain sensors 13a to 13d is elongated, the elongation causes a change in the area of each of the electrodes 42 and 43 as well as a change in the interelectrode distance. The changes in the areas and the interelectrode distance of the electrodes 42 and 43 result in a change in the capacitance C. Thus, each of the elastic strain sensors 13a to 13d may be configured to change the capacitance C according to its elongation. The greater the elongation becomes, the greater the capacitance C will be.

Examples of the elastomer that may be used as the dielectric 41 include natural rubber, isoprene rubber, nitrile rubber (NBR), ethylene-propylene-diene monomer rubber (EPDM), styrene butadiene rubber (SBR), butadiene rubber (BR), chloroprene rubber (CR), silicone rubber, fluorocarbon rubber, acrylic rubber, hydrogenated nitrile rubber, and urethane rubber. These may be used either alone or in combination of two or more of them. Among the examples, urethane rubber and silicone rubber are preferable. The reason is that these rubbers show a smaller permanent set (or permanent elongation). Furthermore, urethane rubber is especially preferable because it is superior in adhesion capability with carbon nanotubes to silicone rubber.

Urethane rubber is made by causing at least a polyol component and an isocyanate component to react with each other. Specific examples of the urethane rubber include: olefin-based urethane rubber, which uses an olefin-based polyol as the polyol component; ester-based urethane rubber, which uses an ester-based polyol as the polyol component; ether-based urethane rubber, which uses an ether-based polyol as the polyol component: carbonate-based urethane rubber, which uses a carbonate-based polyol as the polyol component; and caster oil-based urethane rubber, which uses a caster oil-based polyol as the polyol component. These may be used either alone or in combination of two or more of them. The urethane rubber may be one in which two or more polyol components are used in combination.

An example of the olefin-based polyol is Epol (available from Idemitsu Kosan Co., Ltd.). An example of the ester-based polyol is Polylite 8651 (available from DIC Corp.).

Examples of the ether-based polyol include polyoxy tetramethylene glycol PTG-2000SN (available from Hodogaya Chemical Co., Ltd.), polypropylene glycol Preminol S3003 (available from AGC Inc.), and Pandex GCB-41 (available from DIC Corp.).

The isocyanate component is not limited to any particular isocyanate component, and various known isocyanate components may be used. In addition, when synthesizing the urethane rubber, it is possible that an addition agent such as a chain extender agent, a cross-linking agent, a catalyst, and a rubber accelerator agent may be added into the reaction system as necessary. The elastomer composition may also contain other substances than the elastomer, including addition agents, such as a plasticizer, an antioxidant, a degradation preventing agent, and a coloring agent, and a dielectric filler. From the viewpoint of increasing the capacitance C to improve the detection sensitivity and from the viewpoint of improving the conformability to the measurement target, it is preferable that the average thickness of the dielectric 41 be from 100 µm to 1000 µm, more preferably from 30 µm to 200 µm.

Each of the electrodes 42 and 43 is composed of an electrically conductive composition containing an electrically conductive material. Both of the electrodes 42 and 43 may be composed of the same conductive composition, or the electrodes 42 and 43 may be composed of different conductive compositions. However, it is preferable that both the electrodes 42 and 43 be composed of the same conductive composition.

Examples of the conductive material that may be used for the electrodes 42 and 43 include carbon nanotube, graphene, carbon nanohorn, carbon fiber, conductive carbon black, graphite, metal nanowire, metal nanoparticle, and conductive polymer. These may be used either alone or in combination of two or more of them. A preferable example of the conductive material is carbon nanotube. The reason is that carbon nanotube is suitable to form the electrodes 42 and 43 that can change their shapes according to the deformation of the dielectric 41.

The carbon nanotubes that may be used include various known carbon nanotubes. The carbon nanotube may be a single-wall carbon nanotube (SWNT), a double-wall carbon nanotube (DWNT), or a multi-wall carbon nanotube (MWNT) (in the present application, both are collectively referred simply as a multi-walled carbon nanotube). Moreover, it is possible to use two or more types of carbon nanotubes that have different numbers of walls. Furthermore, each of the carbon nanotubes is not limited to having specific shape characteristics (average length, fiber diameter, and aspect ratio). Accordingly, the carbon nanotubes to be used may be selected as appropriate taking into consideration various factors comprehensively, such as the intended use of the sensor device, the conductivity and durability required for the sensor sheet, and further the process and cost required for forming the electrodes 42 and 43.

The conductive composition that forms the electrodes 42 and 43 may contain a binder component, in addition to the conductive material such as carbon nanotubes. The binder component functions as a connecting material. By adding the binder component to the conductive composition, it is possible to improve the adhesion capability with the dielectric 41 and the strength of the electrodes 42 and 43 themselves. Moreover, it is possible to prevent the conductive material such as carbon nanotubes from scattering when forming the electrodes 42 and 43 in a later-described manner. As a result, it is possible to increase the safety when forming the electrodes 42 and 43.

Examples of the binder component include butyl rubber, ethylene propylene rubber, polyethylene, chlorosulfonated polyethylene, natural rubber, isoprene rubber, butadiene rubber, styrene-butadiene rubber, polystyrene, chloroprene rubber, nitrile rubber, polymethyl methacrylate, polyvinyl acetate, polyvinyl chloride, acrylic rubber, and styrene-ethylene-butylene-styrene block copolymer (SEBS). Another usable example of the binder component is a raw rubber (unvulcanized natural rubber and unvulcanized synthetic rubber). When using such a material with a relatively lower elasticity, it is possible to increase the conformability of the electrodes 42 and 43 to deformation of the dielectric 41. It is particularly preferable that the binder component be the same type of elastomer as that forms the dielectric 41. The reason is that the use of such a binder component remarkably improves the adhesion between the dielectric 41 and the electrodes 42 and 43.

The elongation rate of the elastic strain sensor may be, for example, greater than or equal to 30%, preferably greater than or equal to 50%, more preferably greater than or equal to 100%, and even more preferably greater than or equal to 200%, along the direction of the axis in which the elongate rate is to be measured. The elastic strain sensor uses an elastomer as its base material and has required elasticity. The elastic strain sensor may be used within its elastic range.

For each of the elastic strain sensors 13a to 13d, an elastic strain sensor C-STRETCH (registered trademark) available from Bando Chemical Industries, Ltd. may be employed, as mentioned earlier. However, the elastic strain sensors 13a to 13d are not limited to the just-mentioned elastic strain sensor available from Bando Chemical Industries, Ltd. Various other types of elastic strain sensors are also available from StretchSense Ltd. (New Zealand) and Parker Hannifin Corp. (United States of America), for example. Various types of sensors that are configured to change the capacitance according to elongation may be employed for each of the elastic strain sensors 13a to 13d. It is possible that a type of sensor that can provide appropriate elasticity and sensitivity for the switch device 10 may be employed for the elastic strain sensors 13a to 13d.

In this embodiment, the switch device 10 is furnished with four elastic strain sensors, 13a to 13d.

As illustrated in FIG. 2, the first elastic strain sensor 13a spans along a first straight line m1 and between a top portion 21 of the mounting member 12 and a first peripheral portion e1 of the base 11 that is located outward relative to a portion of the base 11 from which the mounting member 12 protrudes. The first straight line m1 passes through the top portion 21 of the mounting member 12 and extends on the base 11, when viewed in a plan view.

The second elastic strain sensor 13b spans along the first straight line m1 and between the top portion 21 of the mounting member 12 and a second peripheral portion e2 that is located opposite the first peripheral portion e1.

The third elastic strain sensor 13c spans along a second straight line m2 and between the top portion 21 of the mounting member 12 and a third peripheral portion e3 of the base 11 that is located outward relative to the portion of the base 11 from which the mounting member 12 protrudes. As illustrated in FIG. 2, the second straight line m2 passes through the top portion 21 of the mounting member 12, extends on the base 11, and is orthogonal to the first straight line m1, when viewed in a plan view.

The fourth elastic strain sensor 13d spans along the second straight line m2 and between the top portion 21 of the mounting member 12 and a fourth peripheral portion e4 that is located opposite the third peripheral portion e3.

In the embodiment shown in FIGS. 1 and 2, the top portion 21 of the mounting member 12 is composed of the head member 32 mounted on the pedestal 31. One end of each of the elastic strain sensors 13a to 13d is attached to the head member 32. Herein, each of the elastic strain sensors 13a to 13d may be attached to the head member 32 substantially at a natural length. In this embodiment, the head member 32 is balanced by the elastic strain sensors 13a to 13d, which are attached to the four points so that it can maintain a predetermined posture on the pedestal 31.

Also in this embodiment, one end of each of the elastic strain sensors 13a to 13d, which is provided with the terminals 46 and 47 (see FIG. 3), may be attached to a corresponding one of the first peripheral portion e1 to the fourth peripheral portion e4 of the base 11. The respective terminals 46 and 47 of the elastic strain sensors 13a to 13d may be wired to a back side of the base 11 via the first peripheral portion e1 to the fourth peripheral portion e4, and connected to the input detector 15.

It is also possible that the one end of each of the elastic strain sensors 13a to 13d, which is provided with the terminals 46 and 47 (see FIG. 3), may be attached to the top portion 21 of the mounting member 12. Then, the respective terminals 46 and 47 of the elastic strain sensors 13a to 13d may be wired to the back side of the base 11 from the top portion 21 of the mounting member 12, and connected to the input detector 15.

Cover 14

The cover 14 is attached to the base 11 so as to cover a surrounding region of the head member 32. The cover 14 includes openings 14a to 14d disposed at positions corresponding to respective intermediate portions of the elastic strain sensors 13a to 13d. Also in this embodiment, an opening 14e is formed at a top portion of the cover 14 such that the head member 32 is exposed from the opening 14e. Note that the cover 14 is depicted as being a transparent, colorless member in the drawings, and the components inside the cover 14 are depicted by solid lines as appropriate.

Input Detector 15

The input detector 15 is configured to obtain a change in the capacitance of each of the plurality of elastic strain sensors 13a to 13d. The input detector 15 is electrically connected to the elastic strain sensors 13a to 13d. The input detector 15 has the function to measure the capacitance C of a detection portion that changes according to the deformation of the dielectric 41 of each of the elastic strain sensors 13a to 13d. Although not shown in the drawings, the terminals 46 and 47 of each of the elastic strain sensors 13a to 13d are connected to the input detector 15. As a result, the input detector 15 is able to detect the capacitance of each of the elastic strain sensors 13a to 13d.

Any conventionally known method may be used for measuring the capacitance C, and the input detector 15 is not illustrated in the drawings. The input detector 15 may include, for example, a capacitance measuring circuit, an operational circuit, an amplifier circuit, and a power supply circuit. Examples of the method (circuit) for measuring the capacitance C include a CV conversion circuit utilizing a self-balancing bridge circuit (such as an LCR meter), a CV conversion circuit utilizing an inverting amplification circuit, a CV conversion circuit utilizing a half-wave voltage doubler rectifier circuit, a CF oscillation circuit using a Schmitt trigger oscillator circuit, and a technique using a Schmitt trigger oscillator circuit and an F/V conversion circuit in combination.

For example, the input detector 15 may employ the capacitances of the elastic strain sensors 13a to 13d that are fitted in the switch device 10 as the reference values. Thus, the capacitances of the elastic strain sensors 13a to 13d are measured under the condition in which the head member 32 is balanced by the elastic strain sensors 13a to 13d as shown in FIG. 1, and the measured capacitances may be used as the reference values in calibration. Then, the capacitance changes resulting from the elongations of the elastic strain sensors 13a to 13d may be recorded over time by means of the input detector 15.

Operation of Switch Device 10

In this switch device 10, when the head member 32 is moved, elongation occurs correspondingly in the elastic strain sensors 13a to 13d. According to the elongation of each of the elastic strain sensors 13a to 13d, each of the elastic strain sensors 13a to 13d shows a change in capacitance. Then, the change in the capacitance of the corresponding one of the elastic strain sensors 13a to 13d is captured by the input detector 15, and an output corresponding to the change in the capacitance is output therefrom.

Figure 6:
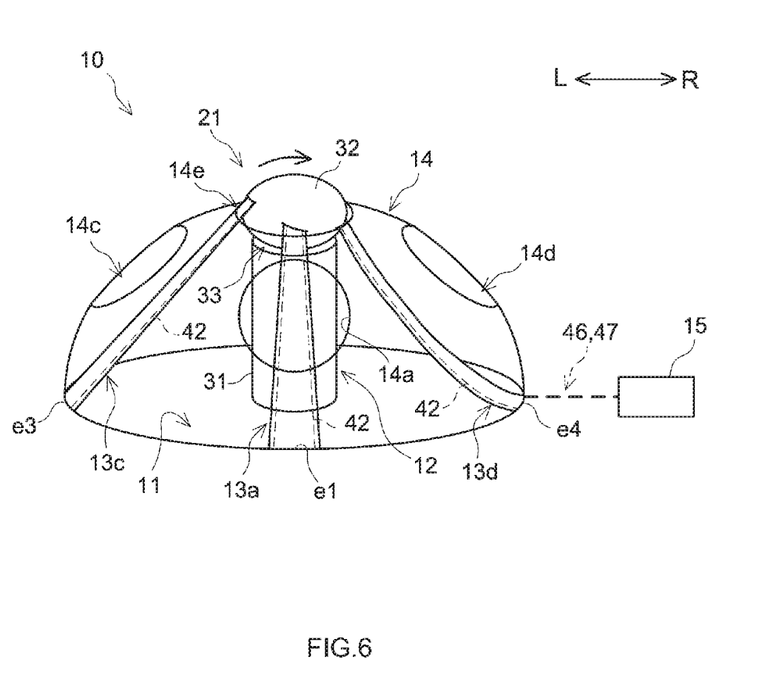
FIG. 6 is a perspective view illustrating a way in which the switch device 10 is used.

FIG. 6 is a perspective view illustrating a way in which the switch device 10 is used. FIG. 6 shows a condition in which the head member 32 is tilted to the right side of the figure. In this case, regarding the elastic strain sensor 13d, which is attached to the right side of the head member 32, the position at which the elastic strain sensor 13d is attached to the head member 32 is moved downward. Accordingly, the elastic strain sensor 13d is loosened, and the entirety of the elastic strain sensor 13d is bent downwardly. On the other hand, regarding the elastic strain sensor 13c, which is attached to the left side of the head member 32, the position at which the elastic strain sensor 13c is attached to the head member 32 is moved upward. Accordingly, the elastic strain sensor 13c is stretched and elongated. In this case, in particular, the left-side elastic strain sensor 13c shows a great change in capacitance. Such a change in the capacitance of the left-side elastic strain sensor 13c enables the switch device 10 to detect that the head member 32 is tilted to the right. Conversely, when the head member 32 is tilted to the left, the right-side elastic strain sensor 13d shows a great change in capacitance. Such a change in the capacitance of the right-side elastic strain sensor 13d enables the switch device 10 to detect that the head member 32 is tilted to the left.

In a like manner, when the head member 32 is tilted to the front, the rear-side elastic strain sensor 13b (see FIG. 2) is elongated. Then, a consequent change in the capacitance of the rear-side elastic strain sensor 13b enables the switch device 10 to detect that the head member 32 is tilted to the front. When the head member 32 is tilted to the rear, the front-side elastic strain sensor 13a is elongated. Then, a consequent change in the capacitance of the right-side elastic strain sensor 13d enables the switch device 10 to detect that the head member 32 is tilted to the rear. Further, when the head member 32 is tilted to the front right, the rear-side elastic strain sensor 13b and the left-side elastic strain sensor 13c are elongated. Then, a consequent change in the capacitance of the rear-side elastic strain sensor 13b and a consequent change in the capacitance of the left-side elastic strain sensor 13c enable the switch device 10 to detect that the head member 32 is tilted to the front right. Also, in this case, the direction in which the head member 32 is tilted can be detected more precisely from the relationship between the change in the capacitance of the rear-side elastic strain sensor 13b and the change in the capacitance of the left-side elastic strain sensor 13c.

Thus, the switch device 10 is able to detect the tilting of the head member 32 not just in the four directions along the straight line m1 and the straight line m2 (see FIG. 2), but also in any direction between the straight line m1 and the straight line m2. Moreover, when the head member 32 is moved continuously, the capacitance of each of the elastic strain sensors 13a to 13d accordingly changes instantaneously. As a result, the switch device 10 is provided with good trackability to continuous movements of the head member 32.

In this switch device 10, the four elastic strain sensors 13a to 13d are arranged in four respective directions along two straight lines being orthogonal to each other and through the head member 32 disposed at a top portion of the mounting member 12. According to a movement of the head member 32 along the two straight lines that are orthogonal to each other, the capacitance of each of the elastic strain sensors 13a to 13d changes. Then, corresponding to the movement of the head member 32, a change in capacitance of the elastic strain sensors 13a to 13d, arranged along the two straight lines that are orthogonal to each other, can be obtained as the output. Because the elastic strain sensors 13a to 13d are arranged in the four respective directions along the two straight lines being orthogonal to each other and through the head member 32, it is easy to analyze how the head member 32 has been moved based on the change in capacitance of the elastic strain sensors 13a to 13d.

In this switch device 10, the capacitance of one of the elastic strain sensors 13a to 13d changes correspondingly not only when the head member 32 is tilted but also when the corresponding one of the elastic strain sensors 13a to 13d is pushed. In this embodiment, the cover 14 includes openings 14a to 14d disposed at positions corresponding to respective intermediate portions of the elastic strain sensors 13a to 13d, for manipulating the switch device 10. This allows the user to insert a finger through one of the openings 14a to 14d to push one of the elastic strain sensors 13a to 13d. With such an operation, when one of the elastic strain sensors 13a to 13d is pushed, another one of the elastic strain sensors 13a to 13d that is disposed opposite is stretched so that the capacitance changes.

Figure 7:
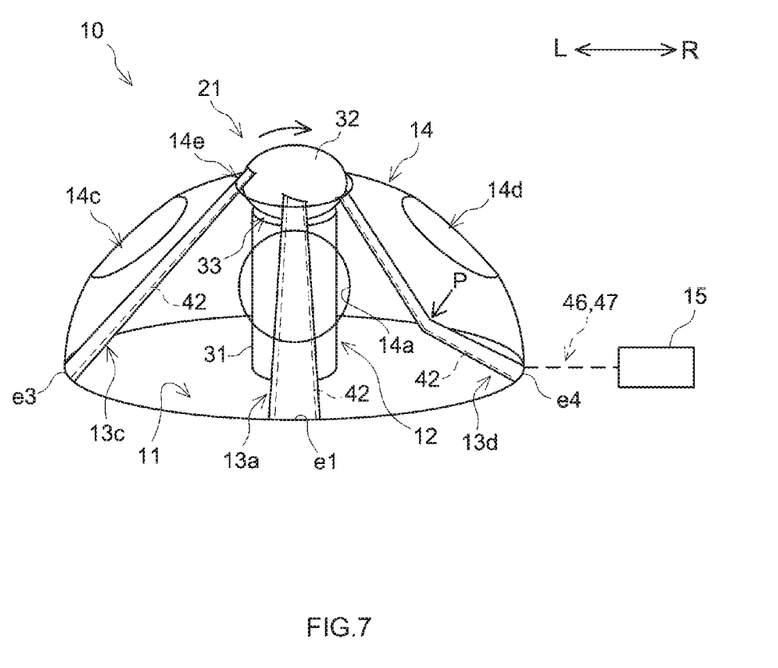
FIG. 7 is a perspective view illustrating another way in which the switch device 10 is used.

Here, FIG. 7 is a perspective view illustrating another way in which the switch device 10 is used. FIG. 7 shows a condition in which an intermediate portion of the right-side elastic strain sensor 13d is pressed down. Here, the arrow P in the figure indicates the load that presses the right-side elastic strain sensor 13d. When the right-side elastic strain sensor 13d is pushed, for example, the head member 32 is tilted to the right by the right-side elastic strain sensor 13d, as illustrated in FIG. 7. Then, the left-side elastic strain sensor 13c is stretched. In this case, the right-side elastic strain sensor 13d, the intermediate portion of which is pressed down, is also stretched slightly. This causes a change in the capacitance of the right-side elastic strain sensor 13d, which is distinguished from the case where the head member 32 is tilted to the right as illustrated in FIG. 6. In this manner, it is detected that the right-side elastic strain sensor 13d has been pressed, based on the change in the capacitance that results from the elongation of the left-side elastic strain sensor 13c and the change in the capacitance of the right-side elastic strain sensor 13d.

Likewise, each of the elastic strain sensors 13a to 13d shows a unique capacitance change for each one of the operations that presses down the intermediate portion of each of the elastic strain sensors 13a to 13d. This enables the switch device 10 to detect which one of the elastic strain sensors 13a to 13d has been pressed, based on the change in the capacitance of each of the elastic strain sensors 13a to 13d. In this embodiment, the openings 14a to 14d for manipulating the switch device 10 are formed in the cover 14, and the openings 14a to 14d are disposed at positions corresponding to respective intermediate portions of the elastic strain sensors 13a to 13d. It is also possible that operational buttons for pushing the intermediate portions of the elastic strain sensors 13a to 13d may be attached to the cover 14 at the positions corresponding to the respective intermediate portions of the elastic strain sensors 13a to 13d. Thus, the cover 14 may be provided with operating parts (the openings 14a to 14d herein) for pressing the intermediate portions of the elastic strain sensors 13a to 13d at positions corresponding to the intermediate portions of the elastic strain sensors 13a to 13d.

In each of the elastic strain sensors 13a to 13d, the greater the displacement becomes, the greater the capacitance will be. As a result, the magnitude of the operation amount can be detected as the input. The switch device 10 may be configured to be a device that can produce an output according to the magnitude of the operation amount performed for each of the elastic strain sensors 13a to 13d. For example, the switch device 10 may be used as a switch for selecting a music track to be played back from a database containing a plurality of music tracks in stock. In this case, the process of selecting a music track to be played back from a list of a plurality of music tracks stored in the database may be configured so that the speed of changing the selected music track can be higher when the operation amount performed for the elastic strain sensors 13a to 13d becomes greater. It is also possible that the process may be configured so that the speed of changing the selected music track can become slower when the operation amount performed for the elastic strain sensors 13a to 13d is smaller. Thus, the magnitude of the capacitance change of each of the elastic strain sensors 13a to 13d in the switch device 10 may be detected as the input information and may be used for a control process.

In the switch device 10, the mounting member 12 includes the pedestal 31 and the head member 32 that is mounted swingably on the pedestal 31. One end of each of the elastic strain sensors 13a to 13d is attached to the head member 32. In this case, the head member 32 is mounted swingably on the pedestal 31, so the height of the head member 32 can be made stable and good operability can be obtained.

In this embodiment, a pressure switch 33 is provided between the pedestal 31 and the head member 32. In this case, depressing of the head member 32 causes the pressure switch 33 disposed between the head member 32 and the pedestal 31 to be pressed. This allows the user to select a music track to be played back. Thus, the pressure switch 33 may be utilized as a selector button or a tact switch.

Moreover, this embodiment is provided with the cover 14 that is attached to the base 11 so as to cover a surrounding region of the head member 32 and the elastic strain sensors 13a to 13d. This serves to protect the head member 32 and the elastic strain sensors 13a to 13d.

Moreover, the cover 14 includes the openings 14a to 14d for operation, disposed at the positions corresponding to respective intermediate portions of the elastic strain sensors 13a to 13d. As a result, the positions of the intermediate portions, at which the elastic strain sensors 13a to 13d are pressed, are defined in the operation of pressing the intermediate portions of the elastic strain sensors 13a to 13d. This serves to stabilize the input in the operation of pressing the intermediate portions of the elastic strain sensors 13a to 13d. In the above-described embodiment, the cover 14 includes the openings 14a to 14d for operation, which are disposed at the positions corresponding to the respective intermediate portions of the elastic strain sensors 3a to 13d. Although not shown in the drawings, the cover 14 may be provided with operating parts for pressing the intermediate portions of the elastic strain sensors 13a to 13d, which are disposed at the positions corresponding to the intermediate portions of the elastic strain sensors 13a to 13d, in place of the openings 14a to 14d. Each of the operating parts may be composed of, for example, a push button.

Figure 8:
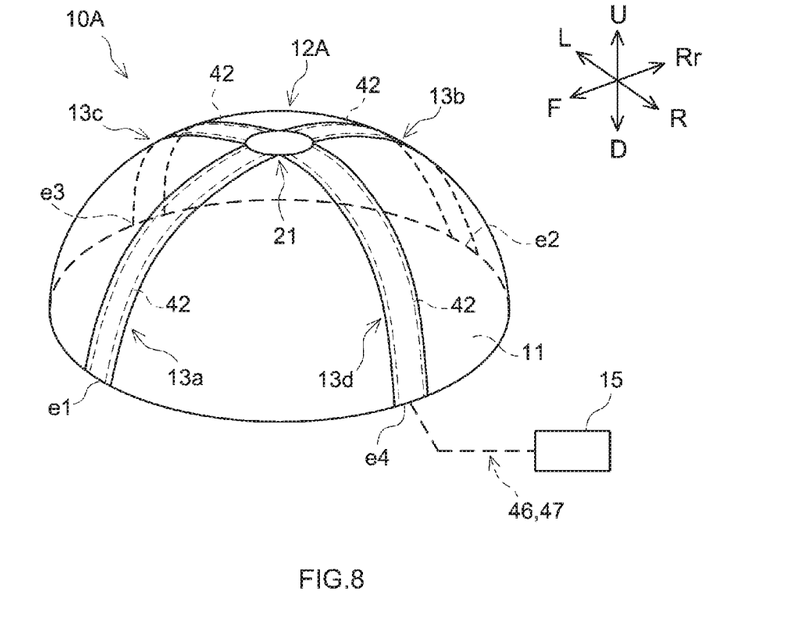
FIG. 8 is a perspective view illustrating a switch device 10A according to another embodiment of the disclosure.
Figure 9:
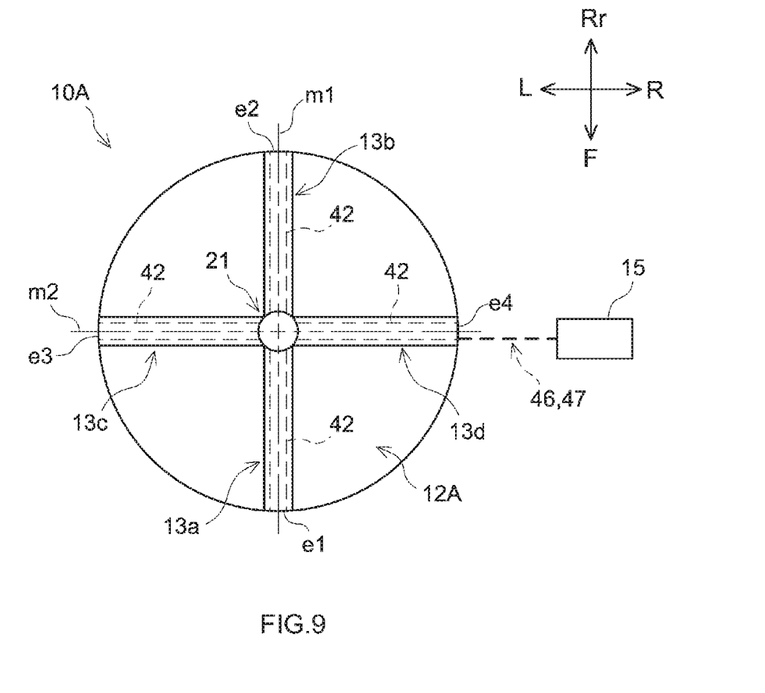
FIG. 9 is a plan view of the switch device 10A.

Next, another embodiment of the switch device 10 will be described below. FIG. 8 is a perspective view illustrating a switch device 10A according to another embodiment of the disclosure. FIG. 9 is a plan view of the switch device 10A. The switch device 10A includes a mounting member 12A, which is composed of either a solid or hollow elastomer. The elastic strain sensors 13a to 13d are arranged along the outer surface of the mounting member 12A.

Mounting Member 12A

The mounting member 12A is composed of a solid or hollow elastomer. The solid or hollow elastomer may be, for example, a mass of elastomer, which may be either solid or hollow. The hollow elastomer may be one in which a gel or a fluid such as the air is enclosed in the inside of a hollow elastomer. In this case, the hollow elastomer may have an appropriate thickness, and it may be a pouch-shaped elastomer.

In this embodiment, the mounting member 12A is composed of a pouch-shaped elastomer in which a gel is enclosed. It is possible that the pouch of the mounting member 12A may employ, for example, a flexible elastomer that shows nick touch feel and required durability. Possible examples of the flexible elastomer that shows nice touch feel and provides required durability include silicone elastomers and urethane elastomers. For example, it is possible to use a sheet made of a silicone elastomer having a thickness of from 50 μm to 1 cm.

In this embodiment, a gel-state material is enclosed in the pouch of the mounting member 12A. It is preferable that the material to be enclosed in the pouch of the mounting member 12A be such a material that does not permeate through the pouch of the mounting member 12A, and such a material that can impart a required internal pressure to the pouch of the mounting member 12A so that the pouch of the mounting member 12A can be returned to its original shape. From such viewpoints, it is preferable to use a gel-state material. The gel-state material to be enclosed in the pouch of the mounting member 12A may be a gel material containing a polar liquid, such as a water-based gel and a polyvinyl alcohol gel, taking into consideration that it is used with the elastomer. Note that there are various candidate materials for the gel material. The gel material to be enclosed therein may have required temperature performance depending on the use environment, and it is preferable that the material does not deteriorate over a long period of time. It is possible to employ a gel material that have required performance from the just-mentioned viewpoint. The gel material may contain a required addition agent added thereto.

It should be noted that a gaseous matter, such as the air, may pass through the pouch of the mounting member 12A. For this reason, when a gaseous matter, such as the air, is enclosed in the pouch of the mounting member 12A, a material that does not easily pass through a gaseous matter should be selected for the pouch of the mounting member 12A. In addition, it is possible to provide a mechanism that can replenish the pouch of the mounting member 12A with the air appropriately. The mounting member 12A may be, for example, a rubber ball-like member.

Thus, the mounting member 12A may be composed of a pouch formed of an elastomer, in which a gel-state material is enclosed. In such a switch device 10A, each of the plurality of elastic strain sensors 13a to 13d is arranged along the pouch of the mounting member 12A. The pouch of the mounting member 12A encloses a gel material as its content. The mounting member 12A is disposed on the base 11 in an expanded state. The top portion 21 of the mounting member 12A is provided with mount portions, each of which is attached to one end of a corresponding one of the elastic strain sensors 13a to 13d.

As illustrated in FIG. 9, when viewed in a plan view, the first elastic strain sensor 13a spans along a first straight line m1 and between the top portion 21 of the mounting member 12A and the first peripheral portion e1 of the base 11 that is located outward relative to a portion from which the mounting member 12A protrudes. The first straight line m1 passes through the top portion 21 of the mounting member 12A and extends on the base 11.

The second elastic strain sensor 13b spans along the first straight line m1 and between the top portion 21 of the mounting member 12A and the second peripheral portion e2 that is located opposite the first peripheral portion e1.

The third elastic strain sensor 13c spans along a second straight line m2 and between the top portion 21 of the mounting member 12A and a third peripheral portion e3 that is located outward relative to the portion of the base 11 from which the mounting member 12A protrudes. The second straight line m2 passes through the top portion 21 of the mounting member 12A and extends on the base 11.

The fourth elastic strain sensor 13d spans along the second straight line m2 and between the top portion 21 of the mounting member 12A and the fourth peripheral portion e4 that is located opposite the third peripheral portion e3.

Although not shown in the drawings, the terminals 46 and 47 of each of the elastic strain sensors 13a to 13d are connected to the input detector 15. The input detector 15 is configured so as to be able to detect the capacitance of each of the elastic strain sensors 13a to 13d. In addition, it is possible that the capacitances of the elastic strain sensors 13a to 13d may be measured under the condition in which the switch device 10A has not yet been operated, and the measured capacitances may be used as the reference values in calibration. As a result, the capacitances of the elastic strain sensors 13a to 13d that have been measured under the condition in which the switch device 10A has not yet been operated are used as the reference values.

In this switch device 10A, when the top portion 21 of the mounting member 12A is moved to the right while being pushed with a user's finger, the right-side elastic strain sensor 13d is loosened while the left-side elastic strain sensor 13c is elongated. In this case, the capacitance of the left-side elastic strain sensor 13c becomes particularly greater. This enables the switch device 10 to detect that the top portion 21 of the mounting member 12A is moved to the right, based on the change in the capacitance of the left-side elastic strain sensor 13c, which has been detected by the input detector 15.

In a similar manner, when the top portion 21 of the mounting member 12A is moved to the left while being pushed with a user's finger, the left-side elastic strain sensor 13c is loosened while the right-side elastic strain sensor 13d is elongated. In this case, the capacitance of the right-side elastic strain sensor 13d becomes particularly greater. This enables the switch device 10 to detect that the top portion 21 of the mounting member 12A has been moved to the left, based on the change in the capacitance of the right-side elastic strain sensor 13d, which has been detected by the input detector 15. When the top portion 21 of the mounting member 12A is moved to the front while being pushed with a user's finger, the rear-side elastic strain sensor 13d is elongated. This enables the switch device 10 to detect that the top portion 21 of the mounting member 12A has been moved to the front, based on the change in the capacitance of the rear-side elastic strain sensor 13b. When the top portion 21 of the mounting member 12A is moved to the rear while being pushed with a user's finger, the front-side elastic strain sensor 13a is elongated. This enables the switch device 10 to detect that the top portion 21 of the mounting member 12A is moved to the rear, based on the change in the capacitance of the front-side elastic strain sensor 13a.

As just described, when the top portion 21 of the mounting member 12A is moved forward, rearward, rightward, or leftward, an output corresponding to each movement can be detected. Moreover, even when the top portion 21 of the mounting member 12A is moved not precisely forward, rearward, rightward, or leftward, but to an intermediate position therebetween, such as to the front right or to the rear right, the elastic strain sensors 13a to 13d are elongated corresponding to each position, and an output corresponding to each movement can be obtained. Thus, the above-described configuration in which the four elastic strain sensors 13a to 13d are arranged in four different directions along two straight lines being orthogonal to each other and through the top portion 21 of the mounting member 12A allows the capacitances of the elastic strain sensors 13a to 13d to change according to the movement of the top portion 21 of the mounting member 12A along the two straight lines orthogonal to each other. The changes of the capacitances of the elastic strain sensors 13a to 13d, which are disposed along the two straight lines being orthogonal to each other and through the top portion 21 of the mounting member 12A, can be obtained as the output. Therefore, it is easy to analyze how the top portion 21 of the mounting member 12A has been moved.

Furthermore, even in cases where intermediate positions of the elastic strain sensors 13a to 13d are pressed, the mounting member 12A undergoes corresponding deformation. The pressed one of the elastic strain sensors elongated, and the opposite one of the elastic strain sensors to the pressed one is also elongated. This enables the switch device 10A to obtain a corresponding output.

Thus, the mounting member 12A of the switch device 10A may be composed of a pouch, formed of an elastomer, that encloses a gel-state material therein. In this case, as illustrated in FIG. 8, the elastic strain sensors 13a to 13d may be arranged along the outer surface of the mounting member 12A. Such a switch device 10A is capable of producing an output according to elongation of each of the elastic strain sensors 13a to 13d, when, for example, the top portion 21 of the mounting member 12A is moved to the front, the rear, the left, or the right while holding the top portion 21 of the mounting member 12A, or when the intermediate portions of the elastic strain sensors 13a to 13d are pressed. The switch device 10A is also capable of detecting what type of operation is input according to the just-described output. Thus, it is possible to provide a switch device 10A that offers an entirely novel structure and novel operability. The mounting member 12A of the switch device 10A may be composed of a pouch, formed of an elastomer, that encloses a gel-state material therein, which offers good touch feel. As a result, it is possible to provide a switch device that offers remarkably softer touch feel, compared to those switch devices with hard touch feel such as provided in a cabin of an automobile.

Although the embodiment has described an example in which the mounting member 12A is a pouch made of an elastomer and filled with a gel-state material, the mounting member 12A is not limited to such an embodiment. The mounting member 12A may be composed of a solid or hollow elastomer. For example, the mounting member 12A may be a mass of elastomer that has required flexibility. Moreover, the mounting member 12A may have a hemispheroidal shape with a smooth surface, or may be a hemispherical surface, for example. The mounting member 12A may be a solid or partially hollow member. When the mounting member 12A is a hollow member, the inside the mounting member 12A may either be filled with a material such as a gel-state material or the air, or not be filled with such a material such as a gel-state material or the air. It is possible that the thickness of the mounting member 12A may be a required thickness so that appropriate flexibility can be obtained. As described above, various embodiments are possible for the mounting member 12A. The mounting member 12A is composed of a solid or hollow elastomer as described above. Therefore, it is possible to provide a switch device with soft touch feel.

The description herein has described an embodiment in which the elastic strain sensors 13a to 13d are arranged in four respective directions, along the first straight line m1 and the second straight line m2 that is orthogonal to the first straight line m1. However, the number and arrangement of the elastic strain sensors 13a to 13d are not limited to any of the embodiments described above, unless specifically described otherwise. The number of the elastic strain sensors 13a to 13d may not be limited to 4. It may be increased or decreased to be, for example, 3, 5, or 6. The elastic strain sensors 13a to 13d may be arranged in such an orientation as to extend from the top portion 21 of the mounting member 12A so as to be circumferentially evenly spaced. Alternatively, the elastic strain sensors 13a to 13d may be not arranged in such an orientation as to extend from the top portion 21 of the mounting member 12A so as to be circumferentially evenly spaced.

In the embodiments of the switch device 10 and 10A disclosed herein, the capacitance of each of the elastic strain sensors 13a to 13d changes according to movement of the top portion 21 of the mounting member 12. Accordingly, it is possible to obtain an output that originates from the change of the capacitance of the plurality of elastic strain sensors 13a to 13d. Thus, it is possible to provide a switch device that has a simple structure that is different from conventional ones and also offers novel operability.

Various embodiments of the switch device have been described hereinabove according the present disclosure. Unless specifically stated otherwise, the embodiments of the switch device described herein do not limit the scope of the present invention. It should be noted that various other modifications and alterations may be possible in the embodiments of the switch device disclosed herein. In addition, the features, structures, or steps described herein may be omitted as appropriate, or may be combined in any suitable combinations, unless specifically stated otherwise.

What is claimed is:

1. A switch device comprising:
   a base;
   a mounting member protruding from the base;
   a plurality of elastic strain sensors each spanning between a top portion of the mounting member and a corresponding one of a plurality of peripheral portions of the base, the plurality of peripheral portions circumferentially spaced apart from each other around the mounting member, and each of the plurality of elastic strain sensors showing an elongation and having a capacitance that changes according to the elongation; and
   an input detector configured to obtain a change in the capacitance of each of the plurality of elastic strain sensors;
   wherein the plurality of elastic strain sensors include:

a first elastic strain sensor spanning along a first straight line and between a top portion of the mounting member and a first peripheral portion of the base, the first peripheral portion located outward relative to a portion of the base from which the mounting member protrudes, and the first straight line passing through the top portion of the mounting member and extending on the base;

a second elastic strain sensor spanning along the first straight line and between the top portion of the mounting member and a second peripheral portion located opposite the first peripheral portion;

a third elastic strain sensor spanning along a second straight line and between the top portion of the mounting member and a third peripheral portion of the base, the third peripheral portion located outward relative to the portion of the base from which the mounting member protrudes, and the second straight line passing through the top portion of the mounting member and extending on the base and being orthogonal to the first straight line; and a fourth peripheral portion spanning along the second straight line and between the top portion of the mounting member and a fourth peripheral portion located opposite the third peripheral portion.

2. The switch device according to claim 1, wherein the mounting member comprises a solid or hollow elastomer, and the plurality of elastic strain sensors are arranged along an outer surface of the mounting member.

3. A switch device comprising:
a base;
a mounting member protruding from the base;
a plurality of elastic strain sensors each spanning between a top portion of the mounting member and a corresponding one of a plurality of peripheral portions of the base, the plurality of peripheral portions circumferentially spaced apart from each other around the mounting member, and each of the plurality of elastic strain sensors showing an elongation and having a capacitance that changes according to the elongation; and an input detector configured to obtain a change in the capacitance of each of the plurality of elastic strain sensors;

wherein the mounting member includes a pedestal and a head member swingably mounted on the pedestal, and one end of each of the plurality of elastic strain sensors is attached to the head member.

4. The switch device according to claim 3, further comprising a pressure switch disposed between the pedestal and the head member.

5. The switch device according to claim 3, further comprising a cover covering the head member and the plurality of elastic strain sensors, the cover being attached to the base.

6. The switch device according to claim 3, wherein the cover includes at least one operating part disposed at a position corresponding to an intermediate portion of one of the plurality of elastic strain sensors, the operating part configured to press the intermediate portion of the one of the plurality of elastic strain sensors.

7. The switch device according to claim 3, wherein the cover includes at least one opening for operation, the opening disposed at a position corresponding to an intermediate portion of one of the plurality of elastic strain sensors.

* * * * *